Patented Oct. 7, 1924.

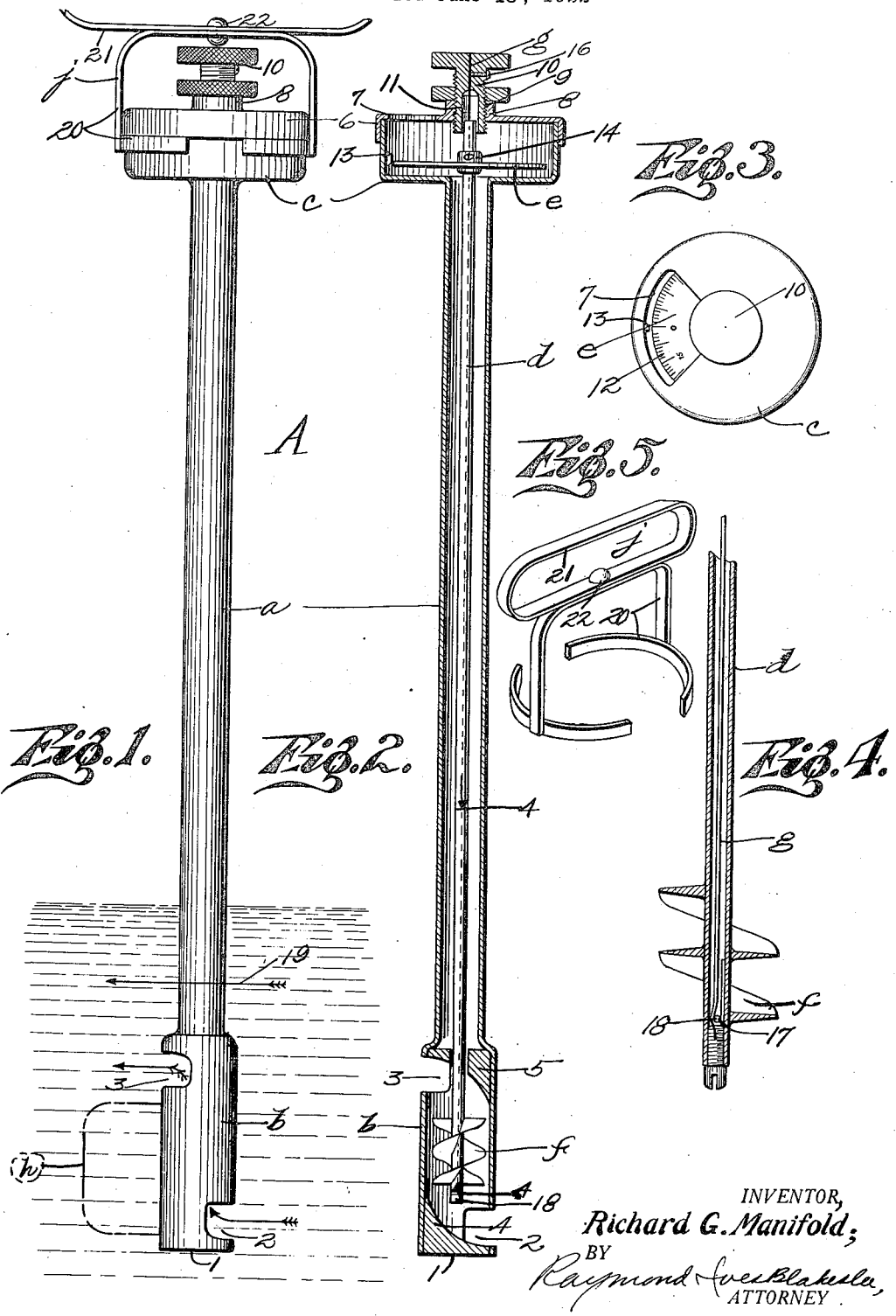

1,510,689

UNITED STATES PATENT OFFICE.

RICHARD G. MANIFOLD, OF RIVERSIDE, CALIFORNIA, ASSIGNOR OF ONE-HALF TO CHARLES O. POOLE, OF RIVERSIDE, CALIFORNIA.

CURRENT METER.

Application filed June 13, 1922. Serial No. 567,894.

*To all whom it may concern:*

Be it known that I, RICHARD G. MANIFOLD, a citizen of the United States, residing at Riverside, in the county of Riverside and State of California, have invented new and useful Improvements in Current Meters, of which the following is a specification.

This invention relates to current meters and is particularly adaptable for measuring the velocity of a stream of water or other liquid. The invention has for an object to provide a current meter which is compact and which may be carried with the person and readily inserted within a stream and the velocity thereof accurately determined.

In practicing the invention I provide a current meter having an outer tubular casing, an end of which is closed and provided with an ingress and an egress port. A second tubular member is concentric within the casing and a wire member extends within the second tubular member to the bottom thereof, and the said wire member is joined to the outer casing and to the inner tubular member at the lower end thereof. The inner tubular member is formed with a spiral flange which is directly acted upon by water or other liquid entering the ingress port and flowing outwardly through the egress port. The flow of water tends to rotate the spiral flange on the inner tubular member and in doing so twists the wire by which said inner tubular member is suspended. The inner tubular member may carry either a dial or a pointer adapted to pass over a graduated dial to directly measure the velocity of the stream. Obviously a torsion is set up in the long wire and this torsion is calibrated so that movement of either the pointer over the dial or the dial with relation to the pointer, may directly set forth the velocity of the stream.

The invention has for further objects the provision of a current meter which is novel in construction, simple and inexpensive, and which has few working parts to get out of order, and is of great service and accuracy.

With the above and other objects in view, the invention consists in the novel and useful provision, formation, construction, combination, association and inter-relation of parts, members and features, all as shown in the accompanying drawing, described in the following statement and finally pointed out with particularity in the claims.

In the drawing:

Figure 1 is an elevation of my improved current meter in actual use;

Figure 2 is a vertical sectional view of the current meter showing the interior construction of same;

Figure 3 is a plan view of the dial member;

Figure 4 is a fragmentary cross sectional view of certain elements of the invention taken on the line 4—4, of Figure 2; and Figure 5 is a detail of the handle member which may be incorporated in said invention.

Corresponding parts in all the figures are designated by the same reference characters.

Referring with particularity to the drawing, the improved current meter is designated in its entirety by A, of which $a$ is a casing member adapted to enclose various mechanism within the same. Said casing member $a$ may be tubular in formation and has its lower end, as $b$, enlarged. The part $b$ is closed at the base thereof as at 1 and provided with an ingress port 2 and an egress port 3 spaced from the ingress port. Opposite the ingress port and the egress port are curved block members 4 and 5 which direct the flow of any liquid entering and leaving the ingress and egress ports. The casing $a$ carries at its opposite end a dial casing $c$, the said dial casing being provided with a cover member 6 having a segmental opening 7 therein. Said cover is provided with an annular flange 8 screw-threaded as at 9 for reception of a flanged nut 10, which is bored as at 11 for reception of a tubular member $d$. The said tubular member $d$ carries in the embodiment shown, a disc $e$ upon which appear graduations 12, and the casing carries as at 13, an indicating finger for determining the amount of turning of the dial $e$ in its play over the graduations 12. Said dial is conveniently held to the member $d$ in any suitable manner, that in the drawing showing that the dial is provided with an annular flange 14 with a screw passing through said flange for engagement with the member $d$. Within the annular space 15 of the enlargement $b$ and between the members 4 and 5 and carried upon the tubular member $d$, is a spiral flange $f$. The tubular member $d$ is held in position within the casing $a$ by means of a wire $g$ passing through a bore in the nut 10 and locked to said nut as by means of a set screw 16 with its opposite end formed into a loop and passed around pin 17, and held in firm contact therewith by a screw 18, which screw is in engagement with threads on the inner surface of the tubular member $d$. Movement of the nut 10 will adjust the height of the tubular member $d$, with attached spiral $f$ and plate $e$ and enable the zero on graduated plate $e$ to be set to pointer 13. It will be noted that this long length of wire and the suspension of the member $d$ will tend to damp out unnecessary variations and oscillations in the said meter. Referring to Figure 1 the stream of water is flowing in the direction of the large arrow 19 and a portion of said stream is following the arrow within the ingress port 2, contacting with the spiral flange $f$ and tending to rotate the tube $d$, which rotation is opposed by the torsion set up in the wire $g$ with the stream passing through said member $b$ and outwardly through the egress port 3. Thus the velocity of the stream may be readily determined by the torsion of the wire $g$. In order to ensure at all times that the ingress port is in direct alignment with the direction of flow of the stream, I may provide a vane $h$ in direct alignment with the centers of the ingress and egress ports and whereby direct entrance within the member $b$ is at all times permitted. I may likewise provide a handle member $j$ formed in two parts as 20 and 21, the part 20 being joined with the meter casing $c$, while the part 21 is swiveled as at 22 to the part 20, the part 21 constituting a handle or hand grip. Thus by grasping the handle 21 and inserting the part $b$ within a stream the vane $h$ will immediately set the port of ingress and egress in correct position for permitting a liquid to pass therein and therefrom by the said current meter swiveling at the point 22, all of this without the necessity of the operator doing more than inserting the lower end $b$ within the stream.

As stated, the dial might be fixed with a movable pointer in place of the arrangement shown, but this is simply a matter of preference. A device of this character is extremely simple of construction and foolproof in every particular, and is readily adaptable for the purpose intended.

It is obvious that various changes and modifications may be made in practicing the invention in departure from the particular showing and disclosure without departing from the true spirit of the invention as defined by the scope of the appended claims.

Having thus disclosed my invention, I claim and desire to secure by Letters Patent:

1. A current meter comprising a casing, one end of which is provided with ingress and egress ports, there being an indicator at the other end of said casing, and means within said casing between the ingress and egress ports for influencing said indicator to indicate the rate of flow of liquid through said ingress and egress ports; said means including a member provided with a spiral flange, a wire joined to the lower end of said last named member and supporting said member, and whereby liquid flowing past the spiral flange tends to rotate the member associated therewith, thereby producing a torque in the wire, the amount of torque produced being a measure of the flow of liquid.

2. A current meter including a casing provided at one end thereof with spaced ports for ingress and egress of a liquid, a wire extending within said casing and joined to a portion thereof, a tubular member concentric about said wire, the lower end of said tubular member and the lower end of said wire being connected, a spiral flange carried by said tubular member within the casing between the ports of ingress and egress, and means actuated by movement of the tubular member and wire for indicating the velocity of flow of any liquid through said ports, the torque produced in the wire being a measure of the rate of flow of the liquid.

3. A current meter including a casing provided at one end thereof with spaced ports for ingress and egress of a liquid, a wire extending within said casing and joined to a portion thereof, a tubular member concentric about said wire, the lower end of said tubular member and the lower end of said wire being connected, a spiral flange carried by said tubular member within the casing between the ports of ingress and egress, and whereby the torque produced in said wire is a measure of the rate of flow of the liquid passing through the ports, and means associated with tubular member and wire for indicating the velocity of flow of any liquid through said ports; said means including an indicating disc carried by the upper end of said tubular member.

4. A current meter including a casing provided at one end thereof with spaced ports for ingress and egress of a liquid, a wire extending within said casing and joined to a portion thereof, a tubular member concentric about said wire, the lower end of said tubular member and the lower end of said wire being connected, a spiral flange carried by said tubular member within the casing between the ports of ingress and egress, and means actuated by movement of the tubular member and wire for indicating the velocity of flow of any liquid through said ports, the torque produced in said wire being a measure of the rate of flow of the liquid, there being a casing at the opposite end of said tubular casing and confining said indicating means.

5. A current meter including a casing provided at one end thereof with spaced ports for ingress and egress of a liquid, a wire extending within said casing and joined to a portion thereof, a tubular member concentric about said wire, the lower end of said tubular member and said wire being connected, a spiral flange carried by said tubular member within the casing between the ports of ingress and egress, and means actuated by movement of the tubular member and wire for indicating the velocity of flow of any liquid through said ports, the torque produced in said wire being a measure of the rate of flow of the liquid, means likewise being provided for adjusting the length of said wire.

6. A current meter including a casing provided at one end thereof with spaced ports for ingress and egress of a liquid, a wire extending within said casing and joined to a portion thereof, a tubular member concentric about said wire, the lower end of said tubular member and the lower end of said wire being connected, a spiral flange carried by said tubular member within the casing between the ports of ingress and egress, and indicating means actuated by movement of the tubular member and wire for indicating the velocity of flow of any liquid through said ports; the torque produced in said wire being a measure of the rate of flow of the liquid; there being a casing at the opposite end of said first-named casing and confining said indicating means; said indicating means including an indicating disc carried by the upper end of said tubular member, there being graduations provided upon said disc, and a pointer associated with said casing confining the indicating means and adapted to play over said graduations.

In testimony whereof, I have signed my name to this specification in the presence of two subscribing witnesses.

RICHARD G. MANIFOLD.

Witnesses:
M. L. BADEN,
WM. S. BATES.